United States Patent [19]

Bohmer et al.

[11] Patent Number: 5,173,986
[45] Date of Patent: Dec. 29, 1992

[54] WINDSHIELD CLEANING SYSTEM WITH EASILY REPLACEABLE NOZZLE AND PIPE

[75] Inventors: Rainer Bohmer, Kirchheim/Neckar; Hans-Peter Reinhardt, Neckarsulm; Bernd Walther, Bietigheim-Bissingen, all of Fed. Rep. of Germany

[73] Assignee: SWF Auto-Electric, Bietigheim-Bissingen, Fed. Rep. of Germany

[21] Appl. No.: 613,800

[22] PCT Filed: Mar. 2, 1990

[86] PCT No.: PCT/EP90/00346
§ 371 Date: Dec. 20, 1990
§ 102(e) Date: Dec. 20, 1990

[87] PCT Pub. No.: WO90/10563
PCT Pub. Date: Sep. 20, 1990

[30] Foreign Application Priority Data

Mar. 11, 1989 [DE] Fed. Rep. of Germany ....... 3907979

[51] Int. Cl.⁵ .................................. B60S 1/46
[52] U.S. Cl. ........................... 15/250.01; 239/284.1; 239/264; 285/921
[58] Field of Search ........... 15/250.01, 250.02, 250.03, 15/250.04, 250.30, 250.34; 239/284.1, 284.2, 261, 264; 285/921, 330

[56] References Cited

U.S. PATENT DOCUMENTS

| | | | |
|---|---|---|---|
| 1,702,877 | 2/1929 | McKee | 15/250.01 |
| 2,609,561 | 9/1952 | Wernig | 15/250.04 |
| 2,714,739 | 8/1955 | Neufeld | 15/250.04 |
| 2,835,916 | 5/1958 | Mittag et al. | 15/250.04 |
| 2,882,545 | 4/1959 | Kelley et al. | 15/250.04 |
| 3,230,564 | 1/1966 | McDevitt | 15/250.04 |
| 3,670,354 | 6/1972 | Weber | 15/250.04 |
| 3,760,451 | 9/1973 | Steed | 15/250.04 |
| 3,887,956 | 6/1975 | Wind | 15/250.04 |
| 4,439,887 | 4/1984 | Fischer et al. | 15/250.04 |
| 4,451,069 | 5/1984 | Melone | 285/921 |
| 4,653,676 | 3/1987 | Stull | 285/921 |

FOREIGN PATENT DOCUMENTS

| | | | |
|---|---|---|---|
| 31629 | 4/1956 | Fed. Rep. of Germany | 15/250.01 |
| 2537470 | 4/1976 | Fed. Rep. of Germany | 15/250.04 |
| 3521024 | 1/1986 | Fed. Rep. of Germany | |
| 3523441 | 1/1987 | Fed. Rep. of Germany | |
| 3632734 | 3/1988 | Fed. Rep. of Germany | 15/250.01 |
| 0016228 | 2/1978 | Japan | 15/250.01 |
| 0194140 | 11/1982 | Japan | 15/250.04 |
| 1198770 | 7/1970 | United Kingdom | 15/250.04 |

Primary Examiner—Harvey C. Hornsby
Assistant Examiner—Gary K. Graham
Attorney, Agent, or Firm—Robert P. Seitter; J. Gordon Lewis

[57] ABSTRACT

A windshield cleaning system, in which the wiper shaft has a through-going bore, into which a pipe is inserted, in order to form a washing liquid channel for a washer system. A nozzle body is locked with the pipe, wherein in addition to the locking device a sealing device is also provided, so that even after a long period of use, no washing liquid can escape at the passage between nozzle body and pipe.

13 Claims, 3 Drawing Sheets

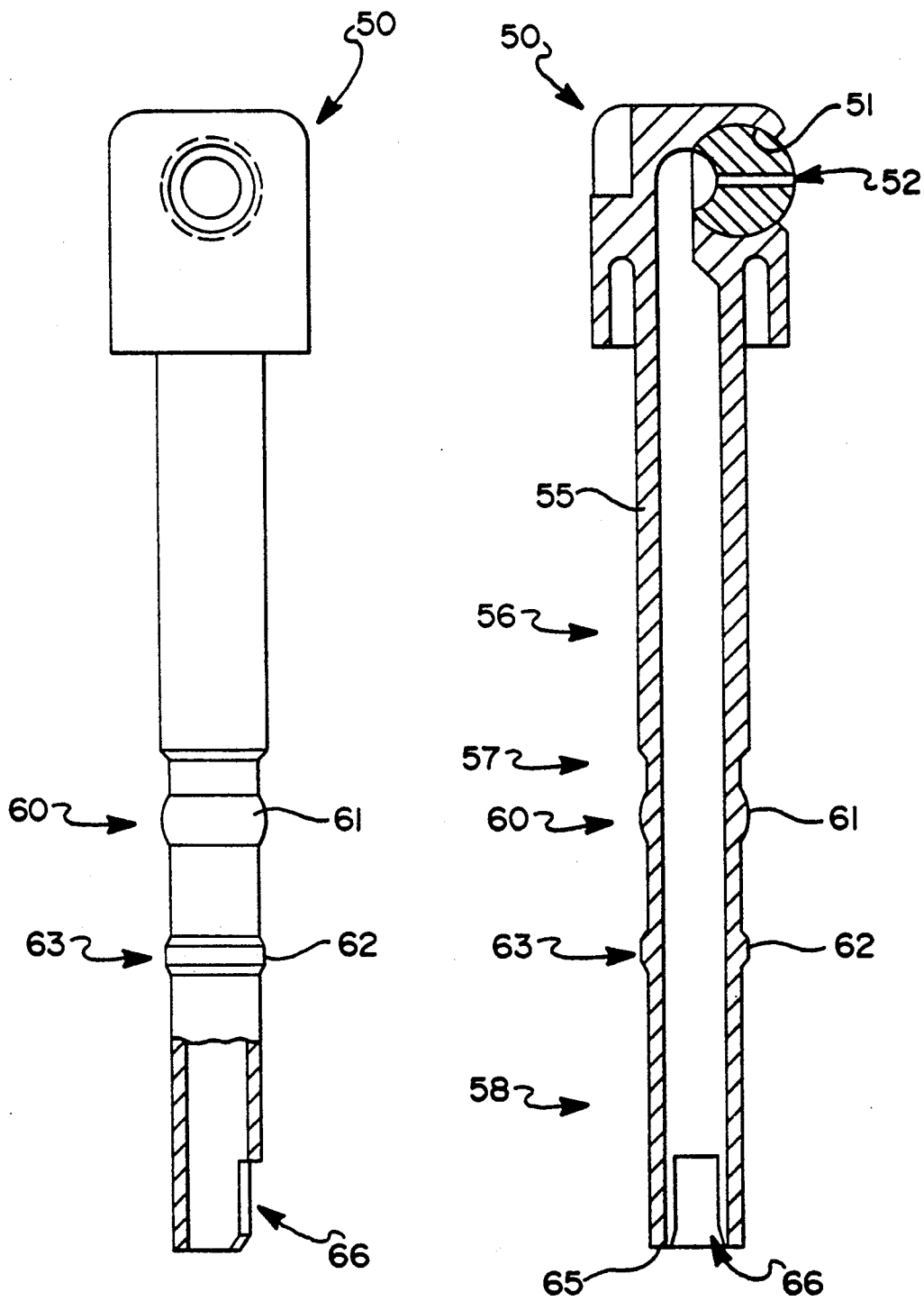

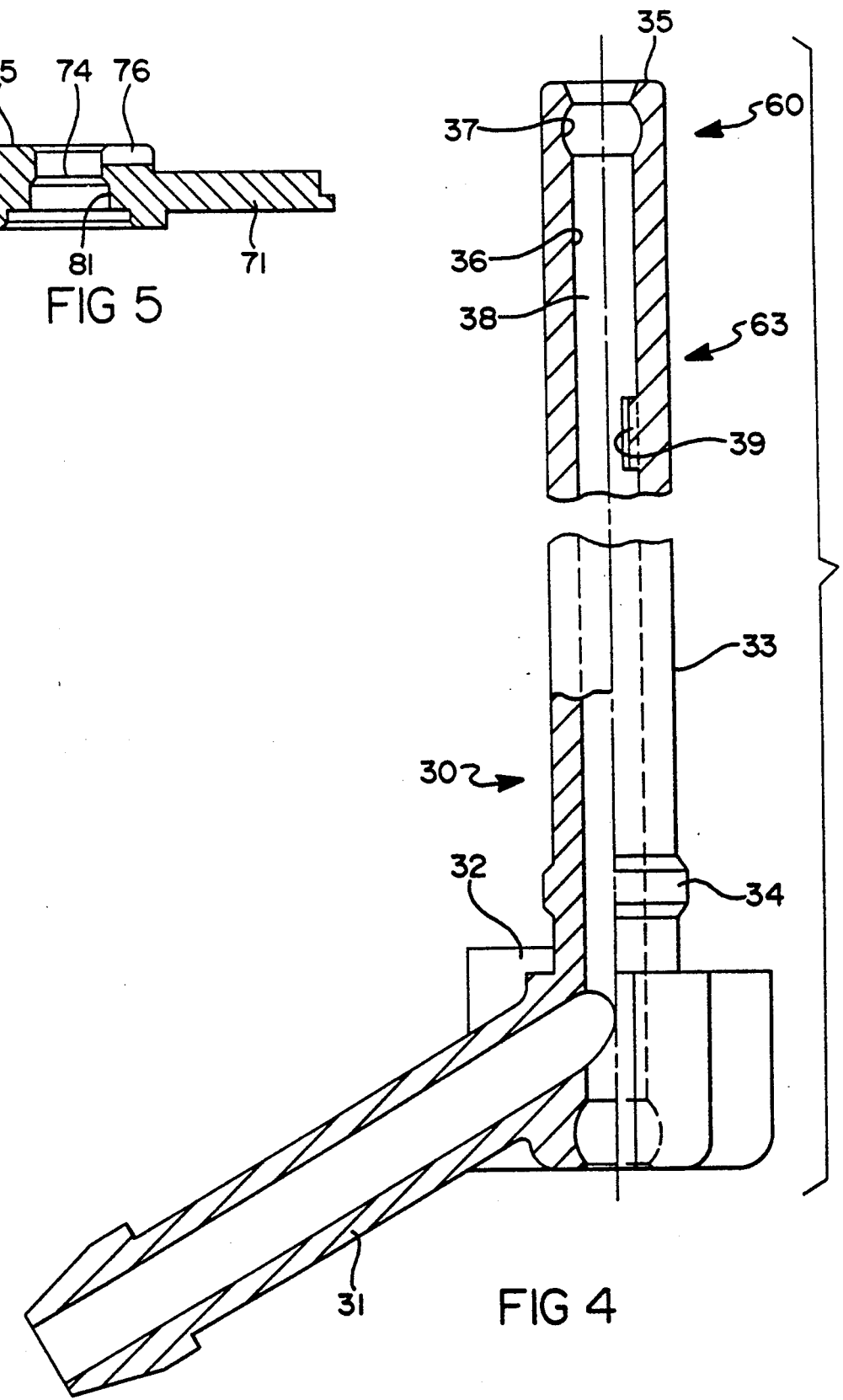

WINDSHIELD CLEANING SYSTEM WITH EASILY REPLACEABLE NOZZLE AND PIPE

This invention relates to a windshield cleaning system, in particular for motor vehicles.

BACKGROUND OF THE INVENTION

Modern motor vehicles have a windshield cleaning system which in addition to a windshield wiper system also includes a windshield washer system, via which washer system washing liquid is sprayed onto the window pane to be cleaned. Recently constructions have been successful in which the washing liquid is supplied from a bore in the wiper shaft to a nozzle above the wiper arm. A system of this kind is known from the German patent 3 523 441. In this construction a pipe for forming a washing liquid channel is put into the through-going bore of the wiper shaft. A pipe union is integrally formed onto one end of the pipe. A nozzle body is locked with the pipe at its other end projecting over the wiper shaft. The nozzle body has a locking recess cooperating with a crowned locking body formed onto the outer surface of the pipe. A construction of this kind has proven worthwhile in practice. However it has to be stated that a demounting of the nozzle body during a possibly necessary repair is very difficult, if the locking device is constructed in such way, that a satisfactory sealing is achieved in this passage between pipe and nozzle body even after a longer service time. If, however, dimensions and materials for the locking body and for the locking recess on the nozzle body are selected, which enable a locking without exerting a great amount of force, it has to be feared, that washing liquid flows out in this place, in particular if the supply pressure is increased. It is furthermore a disadvantage of the known construction that the pipe cannot be exchanged without difficulty, if a rear window wiper system is concerned in which the wiper shaft is directly integrated into the gear housing of the drive motor.

BRIEF DESCRIPTION OF THE INVENTION

The present invention is therefore based on the problem of developing a windshield cleaning system of the initially mentioned kind in such a way that the piece parts forming a washing liquid channel in a through-going bore of the wiper shaft can be easily mounted and can be exchanged when damaged, but in case of increased supply pressures a reliable sealing is nevertheless ensured, even after a long service time.

The invention is based on the idea of meeting the requirements much better than in the known construction by separating locking and sealing functions. In the known construction on the one hand the nozzle body is to be held by the locking body as well as by the locking recess and on the other hand a sealing between pipe and nozzle body has also to be achieved.

In a preferred embodiment—in addition to the locking body—a sealing bead is therefore provided to form a sealing means on the nozzle body, which sealing bead rests against the pipe with press fit.

A particularly reliable connection between nozzle body and pipe is achieved by a development, where the nozzle with its pipe-shaped stud projects into the pipe end, and thus is not slipped over the free end of the pipe as in the known construction. In contrast to the known construction the crowned locking body is arranged on the pipe-shaped stud, whereas the locking recess cooperating with the locking body is formed on the inner wall of the pipe. Between the locking body and the free end of the pipe-shaped stud the sealing bead is provided with a spacing from the locking body, which sealing bead rests against the inner pipe wall with press fit. By moving the locking device into an area within the pipe it is indeed achieved that the nozzle body is so-to-speak fixed in the area of the bore of the wiper shaft. This means on the other hand that the pipe wall can be selected relatively thin, because a giving way of the pipe normally made form plastic material is prevented by the wall at the rim of the wiper shaft bore. Only for regularity's sake it is emphasized that a fixation of a nozzle body within the bore of a wiper shaft is known in itself from the U.S. Pat. No. 2,609,561. There the nozzle body is indeed screwed with the wiper shaft. This can only be realized in wiper systems including wiper shafts with a relatively large diameter. In contrast thereto a construction according to the present invention can also be realized in rear window wiper systems in which wiper shafts having a comparatively small diameter are usual.

According to an advantageous development of the invention the pipe is provided with another locking device in the vicinity of the pipe union in order to simplify mounting and demounting of such a construction, which locking device makes possible a detachable fixation on a stationary holding element. Thus in a construction of this kind the pipe with the pipe union integrally formed thereon can also be exchanged, if for example the holding element were undetachably connected with the cover of a gear housing, in which the gear and the motor for driving the wiper shaft are accommodated. On grounds of mounting technique a solution of this kind is also preferred, when the pipe with the pipe union integrally formed thereon is stationarily held. In this connection it is emphasized that independent protection is requested for this principle of locking a pipe on a stationary holding element, because a construction of this kind can of course also advantageously be realized, when at the other end a nozzle body is locked with the pipe in the manner known from the initially mentioned Germany patent 3 523 441.

The invention and its advantageous embodiments are described below in detail in the accompanying drawings.

BRIEF DESCRIPTION OF THE DRAWINGS

FIG. 2 is a section through the nozzle body at an enlarged scale;

FIG. 3 is a lateral view on the nozzle body;

FIG. 4 is a partial section through the pipe with union at an enlarged scale; and FIG. 5 is a section through a holding element for the pipe.

DETAILED DESCRIPTION OF THE PREFERRED EMBODIMENT

Figure 1:
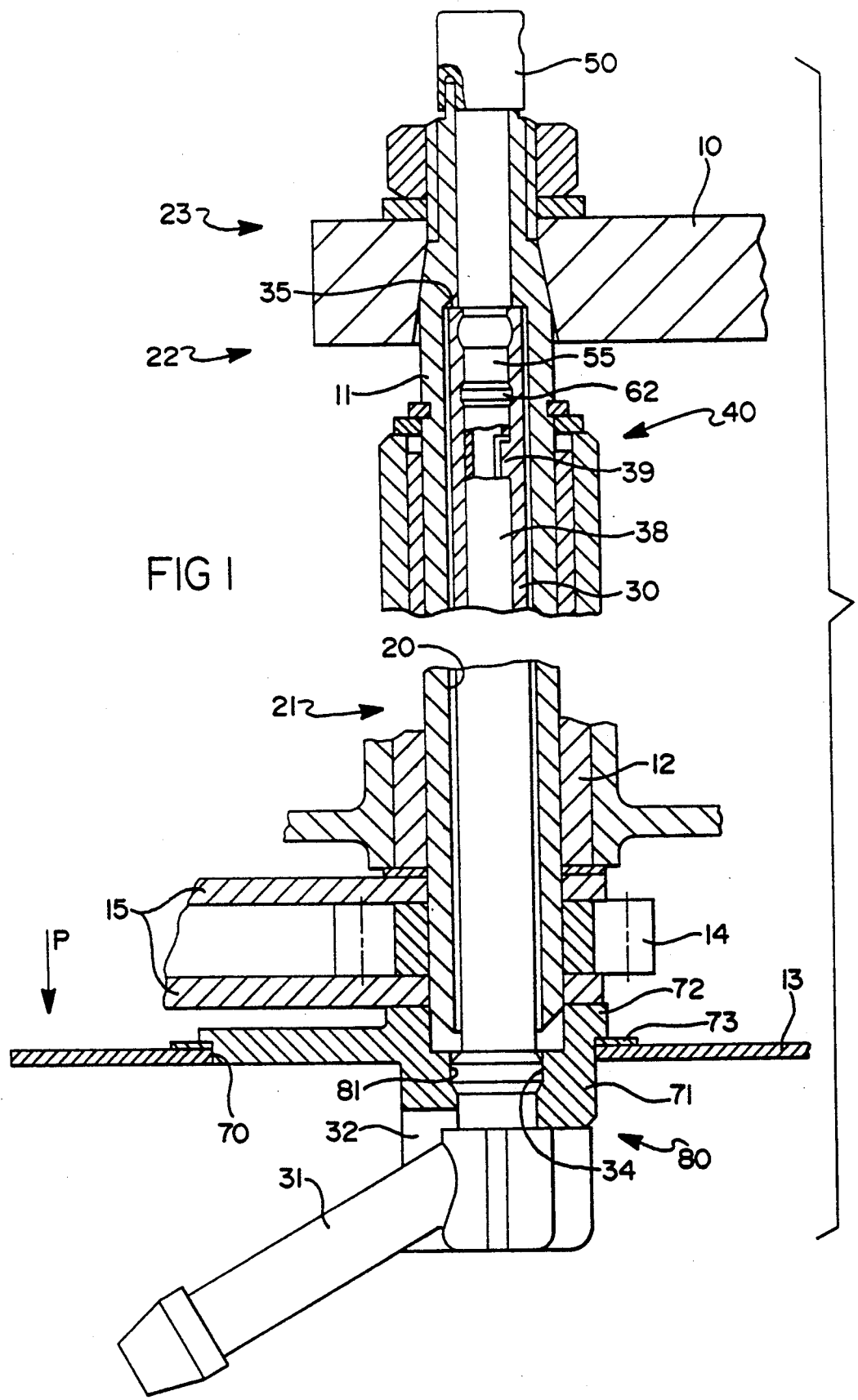
FIG. 1 is a partial section through a windshield cleaning system in the area of a wiper shaft, wherein only parts important to invention are shown.

In FIG. 1 the fastening member of a wiper arm is designated 10, which fastening member is fixed onto the free end of a wiper shaft in a known manner protected against twisting. The wiper shaft is swivellably mounted in a known manner in a bearing bush 12, which projects from a gear housing closed by a cover 13. A pinion 14 and a lever 15 of the gear arranged within the gear housing have been indicated. Windshield cleaning systems of this kind are principally known, so that further statements relating thereto might not be necessary.

The wiper shaft 11 includes a bore 20, which is through-going from the drive side in the area of the pinion 14 to the driven side in the area of the wiper arm, into which bore is inserted a plastic hose or pipe 30 from the drive side in order to form a washing liquid channel. From FIG. 1 can be seen that the bore 20 has portions with different diameters. A first portion 21 with a larger diameter extends from the drive side to a passage 22 at the level of the fastening member 10 of the wiper arm. The portion 23 from the passage to the free end of the wiper shaft 11 has however a slightly smaller diameter.

The pipe 30 is integrally provided with a pipe union 31 at its one end, which pipe union projects at an angle from the axis of rotation of the wiper shaft 11, by which measure the mounting of a hose not shown in detail is facilitated. At the passage between the pipe 30 and the pipe union 31 a fixing nose 32 is provided, whose importance will be illustrated later on. Spaced from the passage one can see in FIG. 1 and in particular also in FIG. 4 a locking projection 34 extending from the generated surface 33 of the pipe 30. Moreover the pipe 30 has a substantially constant outside diameter as far as to the free front face 35, which is spaced from the free end of the wiper shaft 11 and positioned in the passage 22. In the vicinity of this front face 35 a locking recess 37 shaped in the manner of a universal ball joint is formed onto the inner wall 36 of pipe 30. Beginning from locking recess 37 the washing liquid channel 38 widens conically, so that a compulsory ejection of the tool is possible when the plastic hose has been injection-moulded. Spaced from the locking recess 37 an axially aligned web 39 projects from the inner wall 36 of the pipe 30, which web is part of a protecting device against twisting for the nozzle body as a whole designated 50. Nozzle body 50, in FIGS. 2 and 3 shown at enlarged scale, has a hollow 51, into which a ball nozzle 52 may be buttoned in a known manner. The nozzle body 50 has a substantially cylindrical pipe-shaped stud 55 projecting into the end of the pipe 30. The pipe-shaped stud 55 has also portions with different diameters, namely a portion 56 with a large diameter and a portion 58 beginning at a passage 57 with a smaller diameter. From FIG. 1 can be clearly seen that the first portion 56 with the larger diameter, which is fittingly located in portion 23 of bore 20 of the wiper shaft 11, extends from the passage 22 to the free front end. In contrast thereto the other portion 58 of the pipe-shaped stud 55 is arranged in an area of the bore 20 in the wiper shaft 11, in which the diameter of the former is enlarged, so that there is space available for receiving the pipe 30. Thus the portion 58 of the stud 55 is fitted in the end portion of the pipe itself.

A crowned locking body 61 is part of a locking device on the whole designated 60. This locking body projects from the outer wall of the pipe-shaped stud 55 and engages fittingly into the locking recess 37 on the pipe 30. Spaced from this locking body 61 a circumferential sealing bead 62 projects from the outer wall of the pipe-shaped stud 55. This sealing bead is part of a sealing device altogether designated 63. In particular from FIG. 2 can be clearly seen, that sealing bead 62 is provided between the locking body 61 and the free end 65 of the pipe-shaped stud 55 having an axial slot 66.

Thus from the drawings can altogether be seen that between the nozzle body 50 and the pipe 30 a sealing device 63 is provided in addition to a locking device 60 including locking body 61 and locking recess 37, because the circumferential sealing bead 62 rests with press fit against the inner wall 36 on the pipe 30. The locking device 60 and thus also the locking recess 37 is positioned in the vicinity of the free end of the pipe. This is reasonable on grounds of tooling in the interest of a simple production. In contrast thereto the sealing bead 62 is farther away from this free pipe end, because in this area no indentations or similar means have to be worked into the inner wall 36 or the pipe 30. In this area the inner wall is smooth without any indentation. In this connection it is also of advantage that the sealing device 63 is arranged in such a way that because of the cooperation between locking recess 37 and locking body 61 an additional sealing is provided, if required. The nozzle body 50 is thus reliably locked on the pipe 30, whereby it is ensured by an additional sealing device 63, that no washing liquid escapes. A protection against twisting has furthermore been created by cooperation of the axial slot 66 on the nozzle body 60 with the web 39 on the pipe 30.

From FIG. 1 can be seen that the pipe 30 penetrates an aperture 70 in the cover 13. The aperture 70 is closed by a closing element 71, which is inserted in the aperture 70 from the side of the gearing in the direction of arrow P. A seal 73 is provided between a supporting flange 72 and the gear housing cover 13. When the entire system is assembled, the closing element 71 cannot be demounted any more, because it is held in the aperture 70 by the lever 15.

It is important that, in contrast to known constructions, in the construction according to the invention a demounting of the closing element is not necessary, because the pipe 30 may be detachably locked on the closing element 71 serving as a holding element by means of another locking device 80. The closing element 71 has a bore 74 in order to receive the pipe 30 fittingly, whereby in the area of the bore there is provided a locking recess 81 for the locking projection 34 formed on the pipe 30. Thus the pipe 30 with the pipe union 31 integrally formed thereon may be inserted into the bore 74 of the holding element or the closing element 71 fixed beforehand on the gear housing cover opposite to the direction of arrow P and, after a temporary widening of the bore 74, be locked with the closing element 71. Of course an additional sealing is not necessary in this place, because the pipe is made in one piece with the pipe union. A notch 76 is provided at the front 75 of the closing element 71 facing the pipe union 31, into which notch the fixing nose 32 on the pipe 30 can engage. Thus a protection against twisting has been created between the pipe and the stationary closing element 71. For different constructions notches for protection against twisting will be provided on the closing element 71 in different angular positions, so that in case of a uniform development of the gear housing cover the pipe 30 with an integral pipe union 31 can be arranged in different angular positions in such a way that the pipe can be put onto the pipe union 31 without any problems.

What is claimed is:

1. Windshield cleaning system comprising:
   a wiper shaft for driving a wiper arm in pendulum fashion, said wiper shaft including a bore;
   a pipe disposed in said bore to define a washing liquid channel having first and second ends;
   a hose connected to said pipe by a pipe union at said first end;

a nozzle body with a nozzle;

locking means for holding said nozzle body and nozzle on the second end of said pipe, the locking means including a locking recess and a locking body engaging therein sheathed within the wiper shaft;

sealing means arranged for sealing between the nozzle body and the pipe independent of the locking means;

a gear housing;

a cover enclosing the gear housing and having an aperture for conducting the pipe through the cover;

a stationary holding element for closing the aperture in the cover;

another locking means carried by the pipe adjacent the pipe union for detachably fixing the pipe on the stationary holding element; and the wiper shaft projecting from the gear housing covered by the cover having the aperture for conducting the pipe through it, wherein the aperture is closed by the stationary holding element serving as the holding element for the pipe.

2. Windshield cleaning system according to claim 1, wherein said sealing means further comprises a sealing bead on the nozzle body resting against the pipe with press fit.

3. Windshield cleaning system according to claim 1, wherein the nozzle body further comprises a pipe-shaped stud projecting into the second end of the pipe, the locking means further comprising a crowned locking body formed onto the pipe-shaped stud, a corresponding locking recess formed onto an inner wall of the pipe, such that, with a spacing from the locking body, a sealing bead projects from the pipe-shaped stud and rests against the inner wall of the pipe with press fit.

4. Windshield cleaning system according to claim 3, wherein the sealing bead is arranged between the locking body and a free end of the pipe-shaped stud on the nozzle body.

5. Windshield cleaning system according to claim 3, wherein the locking recess is arranged on the pipe adjacent the second end.

6. Windshield cleaning system according to claim 1, wherein the first and second ends of the pipe are spaced from a free end of the wiper shaft.

7. Windshield cleaning system according to claim 1, wherein the pipe is formed from plastic material in one piece with the pipe union.

8. Windshield cleaning system according to claim 1, wherein the nozzle body is held on the pipe in a manner protected against twisting.

9. Windshield cleaning system according to claim 8, wherein a free end of the pipe-shaped stud has an axial slot, and a web axially aligned and engaged in the axial slot projects from an inner wall of the pipe.

10. Windshield cleaning system comprising:
a gear housing;
a cover enclosing the gear housing and having an aperture for conducting a pipe through the cover;
a wiper shaft projecting from the gear housing for driving a wiper arm in pendulum fashion, the wiper shaft including a bore;
a pipe disposed in the bore to define a washing liquid channel having first and second ends;
a hose connected to the pipe at the first end;
a stationary holding and closing element for the aperture in the cover;

first locking means adjacent the first end of the pipe for detachably fixing the pipe on the stationary holding element, said first locking means including the closing element having a bore to fittingly receive the pipe and a first locking recess formed in the area of the bore of the closing element and a first locking projection extending from a generated surface of the pipe engageable within the first locking recess;

a nozzle body with a nozzle;

second locking means for holding the nozzle body and nozzle on the second end of the pipe, the second locking means including a second locking recess and a second locking body engaging therein; and sealing means arranged between the nozzle body and the pipe independent of the second locking means for sealing the nozzle body with respect to the pipe.

11. Windshield cleaning system according to claim 10, wherein the closing element, at a front side facing the pipe union, includes means for securing the pipe and the pipe union with respect to the closing element in a manner protected against twisting.

12. Windshield cleaning system according to claim 10, wherein a front side of the closing element has a notch, and a fixing nose projecting from the pipe is engageable within the notch.

13. A windshield cleaning system comprising:
a gear housing;
a cover enclosing the gear housing and having an aperture for conducting a pipe through the cover;
a wiper shaft projecting from the gear housing for driving a wiper arm in pendulum fashion, the wiper shaft including a bore;
a pipe disposed in the bore to define a washing liquid channel having first and second ends, the first and second pipe ends spaced from a free end of the wiper shaft, the pipe formed from plastic material in one piece with a pipe union;
a hose connected to the pipe by the pipe union at the first end;
a stationary holding and closing element for the aperture in the cover, the stationary holding and closing element for holding the pipe passing through the aperture in the cover, the stationary holding and closing element having a bore in order to fittingly receive the pipe, the stationary holding and closing element, at a front side facing the pipe union, including means for securing the pipe and the pipe union to the stationary holding and closing element in a manner protected against twisting, the securing means including a notch at a front side of the stationary holding and closing element and a fixing nose projecting from the pipe engageable within the notch;
first locking means carried by the pipe in the vicinity of the pipe union for detachably fixing the pipe to the stationary holding and closing element, the first locking means including a first locking recess formed in the area of the bore, and a first locking projection extending from a generated surface of the pipe engageable within the first locking recess, the first locking projection arranged on the pipe in the vicinity of the first end;
a nozzle body with a nozzle, the nozzle body projecting into the first end of the pipe with a pipe-shaped stud, the nozzle body held on the pipe in a manner protected against twisting, a free end of the pipe-shaped stud having an axial slot and a web projecting from the inner wall of the pipe axially aligned and engageable in the axial slot;

second locking means holding the nozzle body and nozzle on the second end of the pipe, the second locking means including a second locking recess and a second locking body engaging therein, the second locking body formed with a crown on the pipe-shaped stud, and the corresponding second locking recess formed on the inner wall of the pipe, the second locking recess arranged on the pipe in the vicinity of second end; and sealing means arranged between the nozzle body and the pipe independent of the second locking means, the sealing means including a sealing bead projecting from the pipe-shaped stud on the nozzle body with a spacing from the second locking body to rest against the pipe with press fit, the sealing bead arranged between the second locking body and the free end of the pipe-shaped stud on the nozzle body.

* * * * *